UNITED STATES PATENT OFFICE.

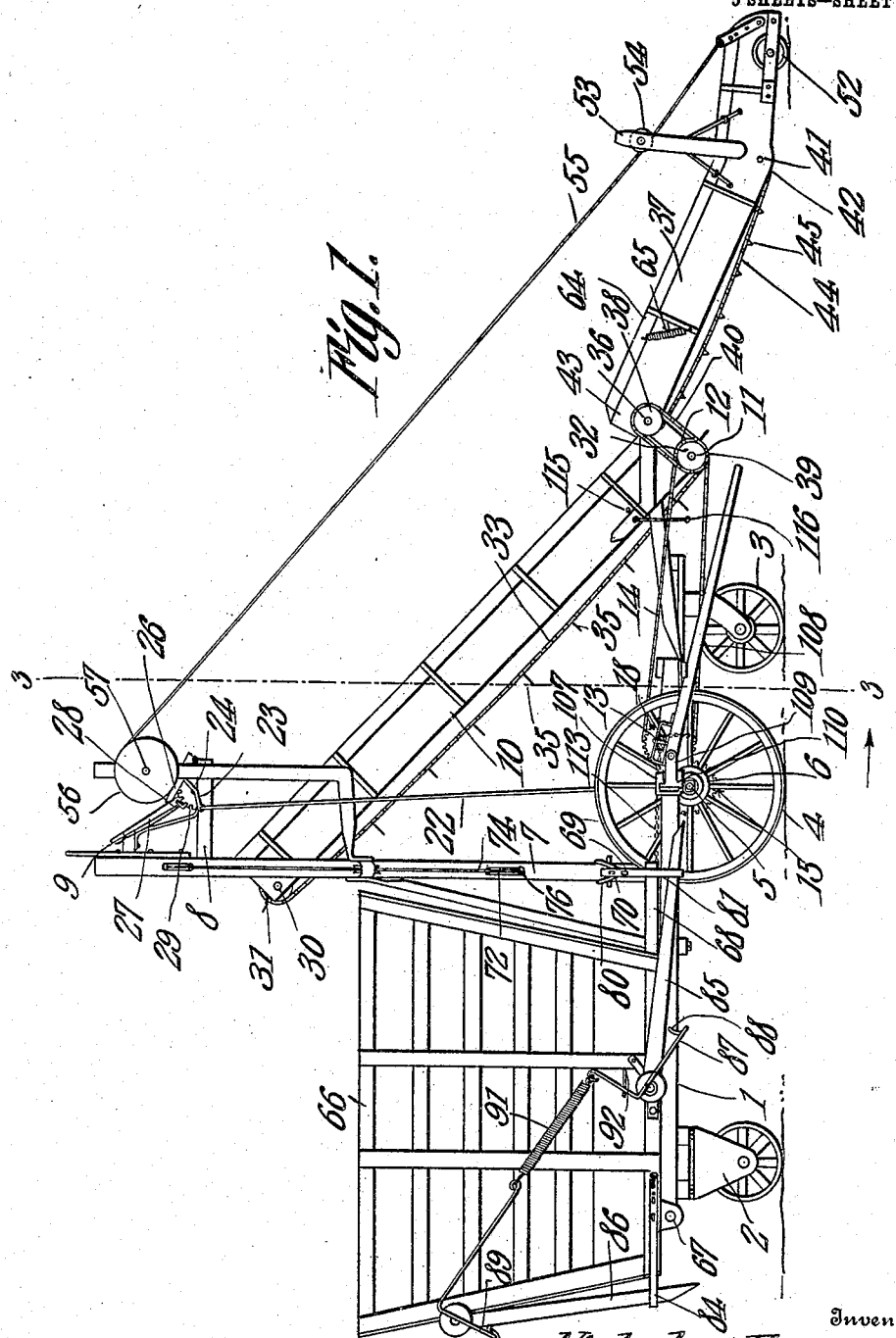

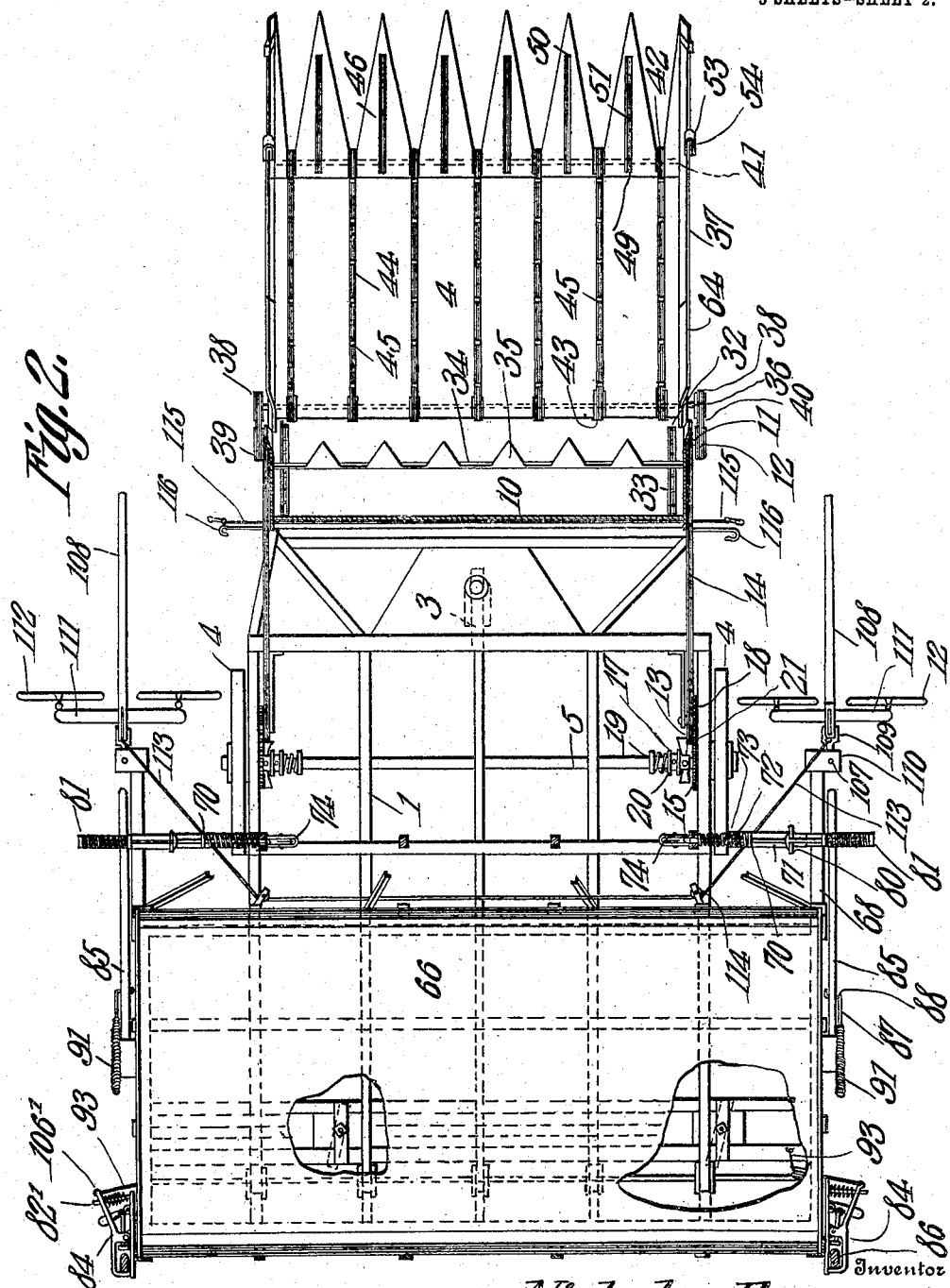

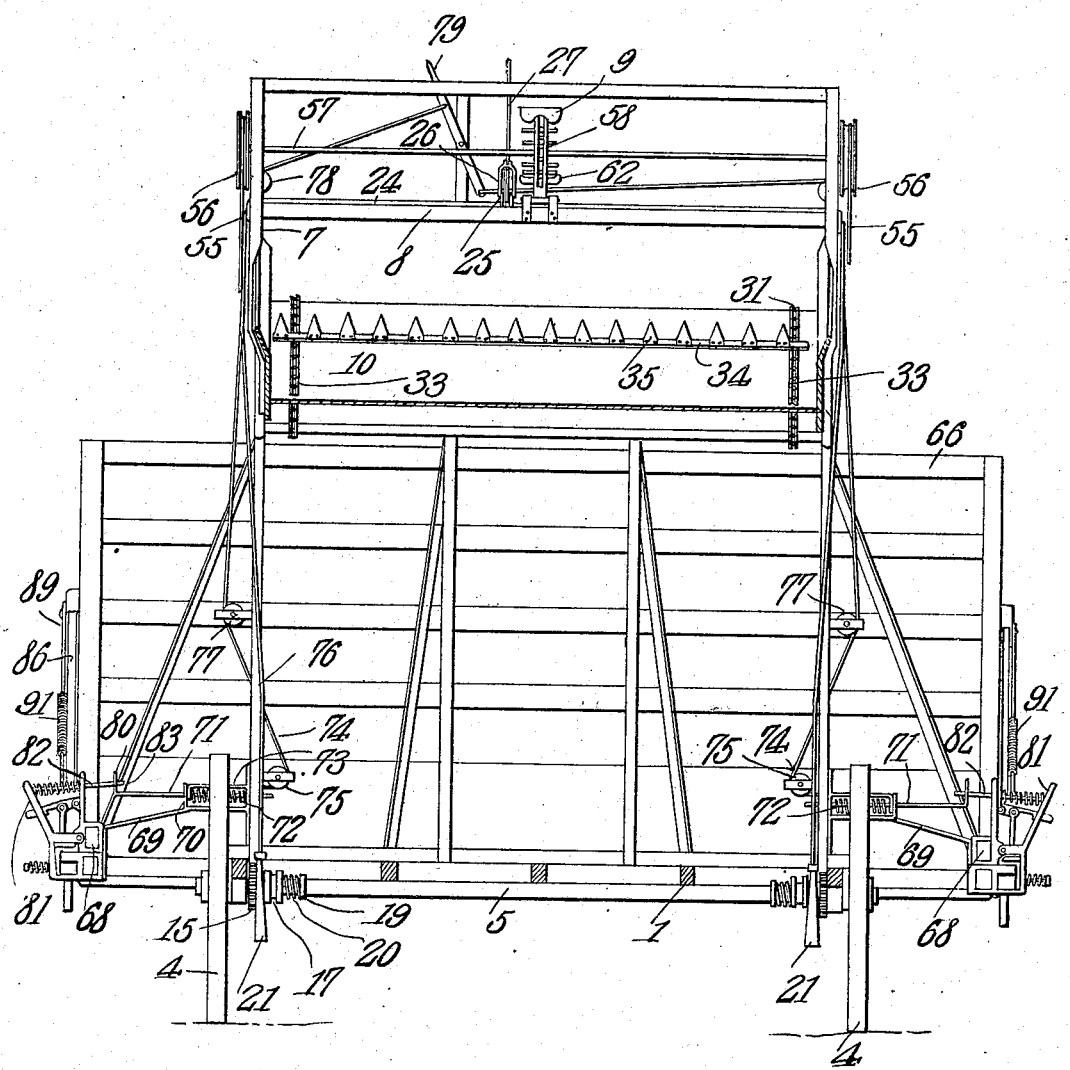

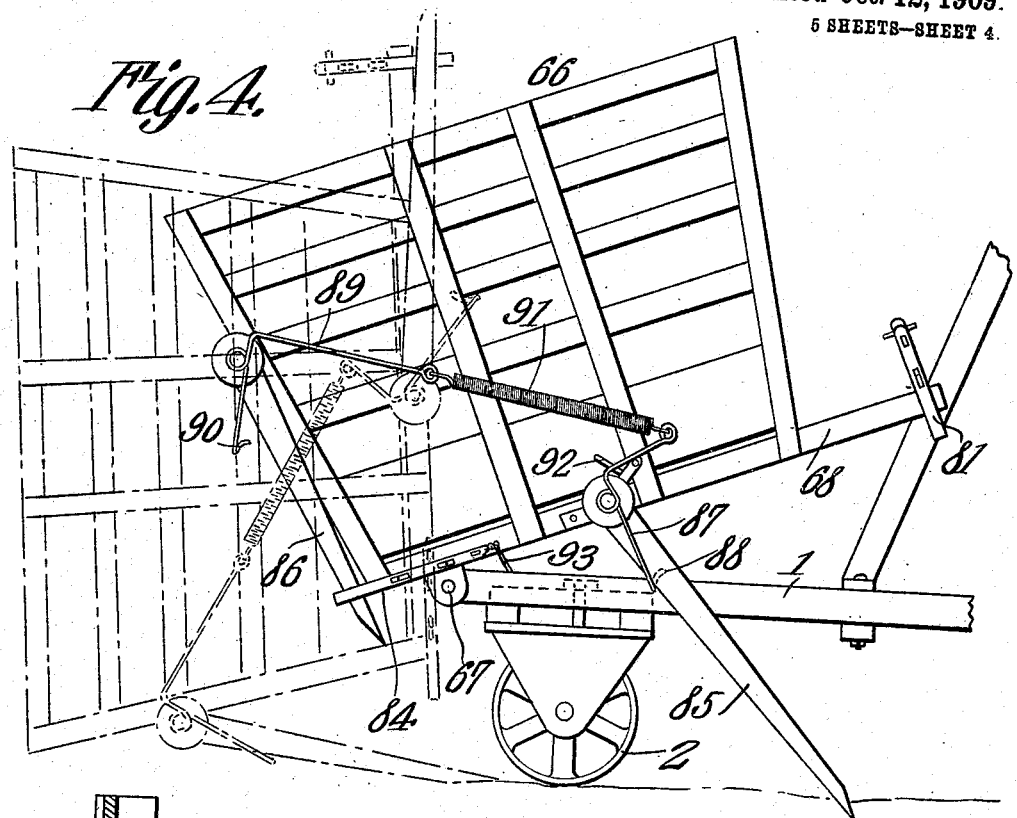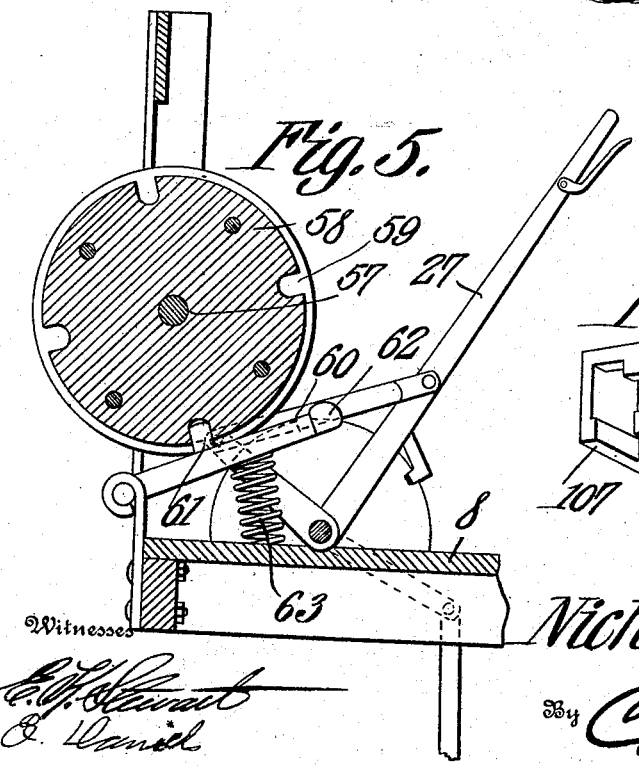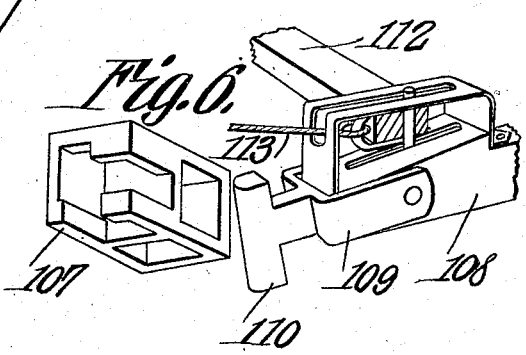

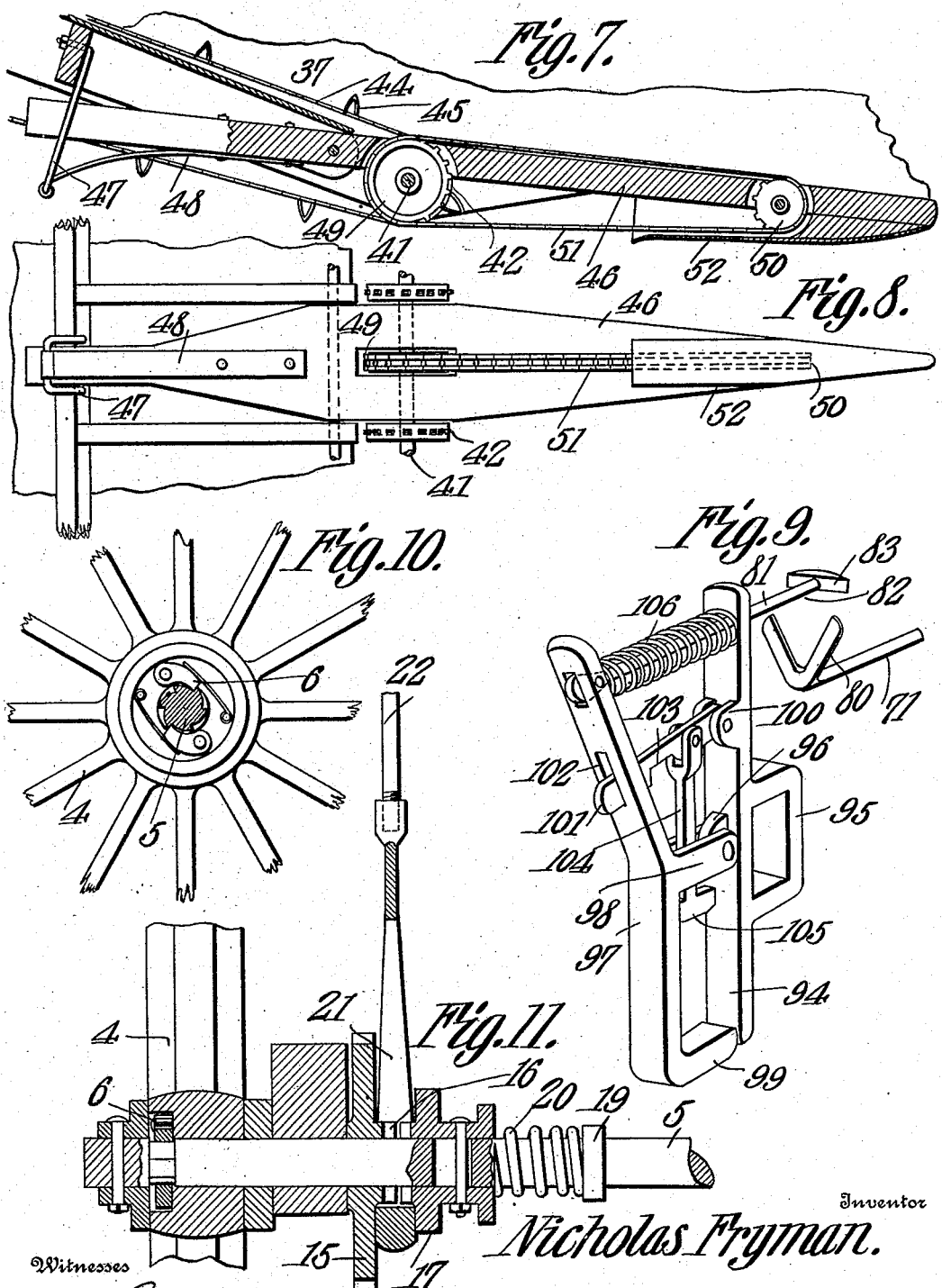

NICHOLAS FRYMAN, OF BOWDON, NORTH DAKOTA.

HAY-GATHERER.

936,621.  Specification of Letters Patent.  Patented Oct. 12, 1909.

Application filed February 27, 1909. Serial No. 480,398.

*To all whom it may concern:*

Be it known that I, NICHOLAS FRYMAN, a citizen of the United States, residing at Bowdon, in the county of Wells and State of North Dakota, have invented a new and useful Hay-Gatherer, of which the following is a specification.

This invention has relation to hay gatherers and it consists in the novel construction and arrangement of its parts as hereinafter shown and described.

The object of the invention is to provide an implement adapted to gather and elevate hay from a windrow or a series of piles or shocks and deposit the same in a tiltable receptacle mounted upon the frame of the implement.

A further object of the invention which is adapted to be actuated at the will of an operator, is to provide mechanism for causing the receptacle to tilt and deposit the accumulation therein, which mechanism is so arranged as to cause the said receptacle to assume a normal position as soon as the contents thereof have been deposited upon the ground.

A further object of the invention is to provide, in an implement of the character indicated, a rigid frame upon which the receptacle and the elevator are mounted and to which is attached a conveyer trunk in such a manner as to move vertically with relation to the said frame. Endless conveyers are mounted for movement along the said conveyer trunk and to the forward end portion of the said trunk resiliently supported fingers are attached which are adapted to have slight vertical movement, subject to spring tension, whereby they may conform to inequalities in the surface of the ground. Also conveyer chains are mounted for orbital movement along the said fingers, and means is provided for protecting the lower runs of the last said conveyer chains against stubble and other growth upon the surface of the soil.

A further object of the invention is to provide means whereby an operator may at will swing the conveyer trunk vertically so that it may assume a position over the elevator, and hingedly mounted side rails are provided upon the conveyer, which, when they come in contact with the side rails of the elevator, are adapted to swing in to permit compact folding of the conveyer against the elevator.

A further object of the invention is to provide, in an implement as stated, a platform which is elevated with relation to the entire device, and from which all of the moving parts of the implement are in view, and their operation may be surveyed, as well as the action of the implement as an entirety upon the material being gathered.

In connection with the implement as above outlined, provision is made for attaching draft animals thereto in such manner that the said animals are free to exercise maximum pulling strain upon the implement, and at the same time they are so positioned as not to trample upon the material which is to be collected. It therefore follows that the draft animals are attached to the frame of the implement at a point behind the forward end of the conveyer, and means is provided for connecting the animals at one side of the implement with the animals at the opposite side thereof, so that when those animals at one side are inclined to make a turn or digress from a straight course, the animals at the opposite side of the implement must move accordingly.

In the accompanying drawings:—Figure 1 is a side elevation of the hay gatherer. Fig. 2 is a top plan view of the hay gatherer. Fig. 3 is a vertical sectional view of the hay loader, cut on the line 3—3 of Fig. 1. Fig. 4 is a side elevation of the rack of the gatherer, indicating the manner in which the same is tilted. Fig. 5 is detail side elevation of a hand wheel and adjacent parts mounted upon the platform of the gatherer. Fig. 6 is a perspective view of a tongue and connection used upon the hay gatherer. Fig. 7 is a sectional view of a finger used upon the machine. Fig. 8 is a bottom plan view of the same. Fig. 9 is a perspective view of a catch used upon the machine. Fig. 10 is a sectional view of the hub of one of the traction wheels of the machine. Fig. 11 is a sectional view of a clutch mechanism used upon the machine.

As illustrated in the drawings, the implement consists of the frame 1, which is mounted at its rear end portion upon the caster wheels 2, and at its forward portion upon a caster wheel 3. Traction wheels 4 are located under the intermediate portion of the frame 1 and support an axle 5. The said wheels 4 are provided at their hubs with the usual escapement mechanism 6, whereby the axle is caused to rotate with the wheels when the said wheels are turning in a forward direction, but which permits the axle 6 to remain at a state of rest when the wheels are turning in a rearward direction. As such construction is common in harvesting machines, its object being to enable the implement to make turns, it is thought that further description of this feature is unnecessary. A derrick 7 is erected upon the intermediate portion of the frame 1 and an operator's platform 8 is supported at the upper end portion of the said derrick 7. A seat 9 is mounted upon the platform 8. An elevator trunk 10 is supported at its lower end portion upon the forward end portion of the frame 1, and at its upper rear end portion upon the upper portion of the derrick 7. The upper end of the trunk 10 projects under the operator's platform 8. A shaft 11 is journaled for rotation at the lower forward end of the trunk 10 and extends transversely across the same. Sprocket wheels 12 are fixed to the end portions of the shaft 11 outside of the side walls of the said trunk 10, and sprocket wheels 13 are journaled for rotation upon the frame 1 in advance of the axle 5. Sprocket chains 14 pass around the sprocket wheels 12 and 13. Gear wheels 15 are journaled for rotation upon the end portions of the axle 5 and are provided with clutch hub 16. Clutch members 17 are feathered to the end portions of the axle 5 and are adapted at times to engage the clutch hubs of the gear wheels 15. The gear wheels 15 mesh with gear wheels 18 which are formed integral with the sprocket wheels 13. Collars 19 are fixed to the end portions of the axle 5 and coiled springs 20 are interposed between the said collars 19 and the inner faces of the clutch members 17. The said springs 20 are under tension with a tendency to force the clutch members 17 toward the clutch hubs 16 of the gear wheels 15. Wedge-shaped loops 21 are interposed between the adjacent faces of the clutch members 17 and the gear wheels 15, and when the said loops are elevated their transverse dimensions are of such magnitude as to disengage the clutch members 17 from the hubs of the wheels 15, but when the said loops are lowered, their transverse dimensions are such as to permit the clutch members 17 to engage the hubs of the wheels 15 subject to the tension of the springs 20. Rods 22 are pivotally connected at their lower ends with the upper ends of the wedge-shaped loops 21 and are pivotally connected at their upper ends with crank extremities 23 provided at the ends of the shaft 24. The shaft 24 extends transversely across the operator's platfrom 8, and at an intermediate point is provided with a laterally projecting arm 25, to which is pivotally attached one end of a link 26. The other end of the link 26 is pivotally connected with an operating lever 27, which is fulcrumed upon the platform 8 and which is provided with a spring-actuated pawl 28, adapted to engage the teeth of a gear segment 29, also mounted upon the platform 8.

From the above description it will be seen that by swinging the lever 27 the shaft 24 may be partially rotated and that the rods 22 may be moved longitudinally, and it is through the connection between the rods 22 and the wedge-shaped loops 21 that the said loops may be moved longitudinally, whereby the clutch members 17 may be permitted to engage the clutch hubs of the wheels 15, or forced away from the same, as above indicated.

A shaft 30 is journaled for rotation at the upper end of the trunk 10 and is provided at its end portions with the sprocket wheels 31. Corresponding sprocket wheels 32 are mounted upon the shaft 11 and endless sprocket chains 33 pass around the said sprocket wheels 31 and 32. Cross slats 34 are connected at their ends with the chains 33 and are provided at intervals with impaling teeth 35. Thus it will be seen that as the implement is drawn along the surface of the ground (in a manner hereinafter to be described) that rotary movement is transmitted from the traction wheels 4 to the shaft 5, and from the said shaft through the wheels 15 (when the clutch members 17 are in engagement therewith) and the wheels 18 and 13, and through the chains 14 and wheels 12 to the shaft 11. As the shaft 11 rotates the sprocket wheels 32 are carried around with the same and thus the chain belts 33 are moved in orbit about the bottom of the elevator trunk 10.

A shaft 36 is journaled for rotation in bearings provided at the upper edge portions of the sides of the elevator trunk 10 and at the lower end thereof, and the said shaft 36 passes transversely through the upper end portion of the conveyer trunk 37. Sprocket wheels 38 are fixed to the outer end portions of the shaft 36 and sprocket wheels 39 are fixed to the outer end portions of the shaft 11. Sprocket chains 40 pass round the sprocket wheels 38 and 39. A shaft 41 is journaled for rotation at the lower forward portion of the conveyer trunk 37 and is provided at intervals with sprocket wheels 42. Corresponding sprocket wheels 43 are mounted upon the shaft 36 and endless sprocket chains 44 pass around the wheels 42 and 43. The chains 44 are provided at intervals along their length with impaling teeth 45. Fingers 46 are pivotally mounted at their upper rear portions upon the shaft 36, and at their rear end extremities project back under the bottom of the forward edge portion of the conveyer trunk 37. Loops 47 depend from the lower side of the bottom of the trunk 37 and the rear ends of the fingers 46 are provided with springs 48 which bear at their rear end portions against the intermediate portions of the loops 47. The said springs 48 are under tension with a tendency to swing the forward end portions of the fingers 46 in a downward direction with relation to the shaft 36. Sprocket wheels 49 are fixed to the shaft 36 and are located in planes in alinement with the median lines of the fingers 46. Idle sprocket wheels 50 are journaled for rotation at the forward end portions of the fingers 46 and endless chain belts 51 pass around the wheels 49 and 50. Each finger 46 is provided at its forward end portion and upon its under side with a spaced shield 52, which houses the forward portion of the lower run of the endless chain belts 51 and also the lower portion of the idle sprocket wheel 50 and prevents the said parts from coming in contact with the stubble at the surface of the ground. The sides of the trunk 37 project in a forward direction beyond the forward end of the fingers 46 and are provided with the supporting wheels 52, as shown in Fig. 1 of the drawings. Standards 53 are mounted upon the sides of the trunk 37 and are provided with the friction wheels 54. The lower forward ends of the cables 55 are attached to the forward end portions of the sides of the trunk 37 and the said cables pass under the pulleys 54 and at their opposite ends are attached to the windings drums 56. The drums 56 are mounted upon the ends of a shaft 57 which is journaled for rotation above the operator's platform 8 and upon which at an intermediate point is fixedly mounted the hand wheel 58. The wheel 58 is provided in its periphery with a series of depressions 59 and a lever 60 is fulcrumed upon the platform 8 and is provided upon its upper side with a projection 61 which is adapted to enter any one of the depressions 59 in the periphery of the wheel 58. The lever 60 is provided at its power end with a foot treadle 62, and a spring 63 is interposed between the platform 8 and the power end of the lever 60 and is under tension with a tendency to hold the said power end of the lever in an elevated position.

From the above description it is obvious that when an operator depresses the power end of the lever 60 by placing his feet thereon that the hand wheel 58 is free for manual rotation, and that by turning the same the shaft 57 will be rotated in its bearings, and the cables 55 will be wound upon the drums 56. As the said cables 55 are shortened the forward end portion of the trunk 37 will be swung up upon the shaft 36 as an axis. Thus means is provided for raising and lowering the trunk 37 and for maintaining the same at a desired elevation. It will also be seen that as the shaft 11 rotates rotary movement will be transmitted to the shaft 36 through the instrumentality of the sprocket wheels 38, 39 and chains 40, and that the belt 44 will be caused to move in orbit about the bottom of the trunk 37, and will also transmit rotary movement to the shaft 41. As the shaft 41 rotates the wheels 42 mounted thereon will move in a similar manner, and orbital movement is transmitted to the endless belt 51 which extends along the fingers 46.

Incident to the movement of the parts as above described it will appear that as the implement is drawn along a windrow of hay or other material lying upon the ground, the said material will be engaged by the forward ends of the fingers 47 and forced upon the same. As soon as the material is engaged by the upper run of the endless chain belt 51 it is conveyed back toward the chain belt 33 and the material is then impaled by the pins 45 and carried up along the elevator trunk 10 and deposited from the upper end of the same into a receptacle, as will hereinafter appear. It will also be seen that inasmuch as the fingers 46 are resiliently held in position against the surface of the ground, they are free to ride over obstructions upon the ground, and at the same time the chain belt located thereon will remain in operation. Thus a desired amount of flexibility is provided between the connection of the fingers with the conveyer trunk 37 to enable the fingers to pass under the material in depressed places, and also to force the same under material lying upon places which are relatively elevated. The sides of the trunk 37 are provided at their rear end portions with the hinged sections or guides 64. The said guides 64 normally occupy planes at acute angles to the vertical planes of the sides of the trunk 37 and are held in such position under tension of the springs 65 which are attached at their upper ends to the said sections 64, and at their lower ends to the lower portions of the sides of the trunk 37. It will also be seen that when the trunk 37 is swung up upon the shaft 36 over the trunk 10, the rear ends of the said sections 64 will engage the sides of the trunk 10 and swing in over the intermediate portion of the trunk 37 against the tension of the springs 65; but, as soon as the trunk 37 is lowered into its normal position the tension of the said springs 65 comes into play and swings the sections 64 back into their normal positions as described.

A rack or receptacle 66 is hingedly mounted upon the rear end portion of the frame 1 a transversely disposed shaft 67 serving as the hinge pin for the said rack. The base of the said rack normally rests upon the platform 1, and the upper edge of the said rack is normally below the delivery end of the elevator trunk 10. As will be hereinafter described, the said rack may tilt rearwardly, and, in doing so, its contents are dumped upon the ground, and, after depositing its contents, means is provided for automatically causing the said rack to assume its normal position upon the platform as indicated.

The rack 66 is provided in the plane of its bottom with the forwardly disposed beams 68, which normally lie against the outer portions of the shoulders 69, attached to the frame 1 and the derrick 7. Guides 70 are mounted upon the shoulders 69 and arms 71 are slidably mounted in the said guides 70. The rods 72 are slidably mounted in the outer members of the derrick 7 and are connected at their outer ends with the arms 71. Coiled springs 73 are interposed between the outer sides of the outer members of the derrick 7 and are the means of connection between the outer ends of the rods 72 and the arms 71. Said springs are under tension with a tendency to hold the arms 71 projected outwardly with relation to the outer members of the derrick 7. Cables 74 are attached at their lower ends to the inner ends of the rods 72 and pass around pulleys journaled for rotation upon the outer members of the derrick 7, thence through openings 76 provided in the said members, and around pulleys 77 journaled for rotation at the outer sides of the said members. The said cables then pass around the pulleys 78 journaled for rotation in the said derrick members at points above the platform 8 and connect at their ends with a lever 79 at opposite sides of the fulcrum points thereof. The arms 71 are provided with the upstanding bifurcated ends 80.

From the above description it is obvious that when the lever 79 is swung upon its fulcrum the cables 74 will be moved longitudinally, and that, through the connections between the said cables and the arms 71, said arms will be moved longitudinally in the guides 70 upon the shoulders 69. Such movement on the part of the arms 71 is in an inward direction, and when the lever 79 is released the arms 71 are moved in the opposite direction under the tension of the springs 72.

Catches 81 are mounted upon the beams 68 and will be described in detail hereinafter. Each catch is provided with a cross-bar 82, which is provided at one end with an enlarged head 83, adapted to engage the bifurcated ends 80 of the arms 71, the shank of the said bar 82 lying in the bifurcations of the said arm. Thus when the arm 71 is moved longitudinally, the catch 81 connected therewith, as above described is opened and the part retained thereby is liberated. Catches 84 are located at the rear portion of the rack 66. Said catches 84 are similar in construction to the structure of the catches 81 to be presently described.

Props 85 are pivotally connected at their rear ends with the lower portion of the rack 66 and are normally held in elevated position at their forward ends by the catches 81. Props 86 are pivotally connected at their upper ends to the upper rear side of the rack 66 and are normally retained at their lower end portion by the catches 84. Crank levers 87 are pivoted to the pivots of the props 85, and are provided with end portions 88, which normally lie under the said props, but are spaced from the same. Crank levers 89 are pivoted to the pivots of the props 86 and are provided with angularly disposed ends 90, which lie behind the rear edges of the said props and are normally spaced from the same. Coiled springs 91 are connected at their ends with the opposite ends of the crank levers 87 and 89. Stops 92 are attached to the ends of the rack 66 and are located in the paths of movement of the crank levers 87, and are adapted to limit those ends of the said levers 87 which are disposed toward the rear end of the frame 1 in their movement rearwardly. The parts being arranged as described, it is obvious that when the forward ends of the props 85 are released from the catches 81, the said ends of the props fall to the ground, and in their descent they strike the inturned portions 88 of the levers 87. At the same time that the implement advances or moves forward the props swing the rack 66 upon its hinge-pin 67, so that the said rack is tilted rearwardly and the material which has been collected therein is dumped upon the ground. As soon as this occurs the cables 93 become taut and open the catches 84, which liberate the lower ends of the props 69, and said props come in contact with the ground and swing the rack back to its normal position upon the platform 1. The cables 93 are connected at their inner ends to fixed points upon the platform 1, and at their outer ends are connected with the outer swinging members of the catches 84, and as said catches describe an arc when the rack 66 tilts backward, the cables 93 become taut, as above described.

As above stated, the catches 81 and 84 are of the same general construction, the only difference being that the catches 81 are provided with enlarged heads 83 at the ends of the cross-bar 82. This being the only difference, a subsequent description of one of the catches will answer for all. Each catch consists of a member 94, which is provided at one side with a loop 95, adapted to receive a beam portion or other support. The member 94 is provided upon its side opposite that side upon which the loop 95 is mounted with a lug 96. A member 97 is provided at an intermediate point with the laterally disposed lugs 98, which are pivoted to the lug 96 of the member 94, and the said member 97 is provided with a laterally disposed end 99, which is adapted to bear against the extremity of the member 94. The member 94 is also provided with the laterally disposed lugs 100, and a latch-bar 101 is pivoted at one end between the lugs 100, and has its opposite end portion attached to an opening 102, provided in the shank portion of the member 97. The latch bar 101 is provided at an intermediate point with a notch 103, which at times is adapted to receive the edge of the slot 102. A trip bar 104 is pivotally connected with the latch bar 101 and projects between the lugs 98 of the member 97 and is provided at its opposite ends with an enlarged head 105. In the catch members 81 coil springs 106 surround the portion of the cross bar 82 and are interposed between the ends of the members 97 and 94 opposite the ends thereof which come in contact with each other, and the cross bar 82 passes through a perforation in the end portion of the member 94 and is pivoted at its opposite end to the end of the member 97. Fig. 9 of the drawings is a perspective view of the arrangement of the parts 82 and 106 as described. In the catches 84 the bar 82, as shown in Fig. 9, is substituted by the bar 82′, and in lieu of the spring 106, as shown in Fig. 9, a spring 106′ is employed. Otherwise the structure of the catches is identical, as above indicated. Therefore, it will appear that when the prop 85 comes in contact with the surface of the ground as above described and as illustrated in heavy lines in Fig. 4 of the drawings, the said prop will tilt the rack 66 rearward, and at the same time come in contact with the extremity 88 of the angle lever 87. Thus the spring 91 is stretched, and when the rack 66 dumps its load, the lower end of the prop 86 comes in contact with the ground and pushes the rack 66 back upon the frame 1. As the said rack 66 seats upon the frame 1 the tension of the spring 91 is exerted through the lever 89 and the end portion 91 against the rear edge of the prop 86, and the said prop is swung toward the open catch 84. Said catch 84 is held open by reason of the fact that the latch bar 101 thereof has moved longitudinally in the slot 102 and the notch 103 of the said latch bar has received the said slot. As the lower portion of the prop 86 flies toward the catch 84 under the tension of the spring as above described the said prop 86 strikes the head 105 of the trip bar 104 and swings the latch bar 101, so that the lower edge of the notch 103 is moved away from the edge of the slot 102 and the said catch member 97 is free to swing under the tension of the spring 106. When the member 97 swings as indicated the end portion 99 thereof comes behind the prop 86 and the said prop is secured in its normal position. At the same time the prop 85 is swung upward under the tension of the spring 91 and the said prop is swung between the jaws of the catch 81, when the operation similar to that last above described occurs, and the prop 85 is secured in its normal position with relation to the tiltable body rack 66.

Coupling blocks 107 are attached to the frame 1 at the sides of the traction wheels 4, and the draft tongues 108 are provided with pivoted brackets 109 each of which has lugs 110, adapted to engage detachably the coupling block 107. Double-trees 111 are mounted upon the tongues 108, and swingle-trees 112 are carried by the said double-trees. The said double-trees 111 are slidably mounted with relation to the tongues 108, and the double-tree at one side of the machine is connected with the double-tree at the opposite side of the machine by means of a cable 113, which passes transversely across the machine and around the pulleys 114, provided upon the frame 1.

It is of course to be understood that draft animals are hitched to the swingle-trees 112, and the inner animal at one side of the machine is connected with the inner animal at the opposite side of the machine by means of a cross cable 115, which is attached at its ends to the bridles of the said inner animals. The inner animal at one side of the machine is connected with the machine by means of a hook 116, which hook is attached at one end to the side of the machine, and is adapted to be caught in the breast strap of the inner animal. A similar connection for the inner animal at the opposite side of the machine is provided. Thus it will be seen that as the animals at one side of the machine turn, the animals at the opposite side of the machine must turn accordingly.

Having thus described my invention, what I claim as new, and desire to secure by Letters Patent, is:—

1. A hay gatherer comprising a wheel mounted frame, an elevator located thereon, a conveyer pivotally connected with the elevator, spring-supported fingers carried at the forward end of the conveyer, and a tiltable rack mounted upon the frame.

2. A hay gatherer comprising a wheel mounted frame, an elevator located thereon, a conveyer pivotally connected with the elevator, fingers located in advance of the conveyer, means for swinging the conveyer with relation to the elevator, and a tiltable rack located upon the frame below the delivery end of the elevator.

3. A hay gatherer comprising a wheel mounted frame, an elevator located thereon, a conveyer pivotally connected with the elevator, pivotally mounted fingers attached to the forward portion of the conveyer, springs for holding the said fingers in normal position, and a tiltable rack mounted upon the frame below the delivery end of the elevator.

4. A hay gatherer comprising a wheel mounted frame, an elevator mounted thereon, a conveyer pivotally connected with the elevator, pivotally mounted fingers at the forward end of the conveyer, a belt mounted for orbital movement along the fingers, and a tiltable rack located upon the frame below the delivery end of the elevator.

5. A hay gatherer comprising a wheel mounted frame, an elevator located thereon, a conveyer pivotally connected with the elevator, fingers pivotally connected with the conveyer, springs for holding the said fingers in normal position, endless belts mounted for orbital movement along the fingers, and a tiltable rack located upon the frame below the delivery end of the elevator.

6. A hay gatherer comprising a wheel mounted frame, an elevator located thereon, a conveyer pivotally connected with the forward portion of the elevator, teeth pivotally mounted at the forward end of the conveyer, springs for holding the said teeth in normal position, endless conveyer chains mounted for orbital movement along the said teeth, shielding hoods to the teeth and adapted to protect the lower runs of the said chains against stubble, and a tiltable rack mounted upon the frame and located below the delivery end of the said elevator.

7. A hay gatherer comprising a wheel mounted frame, an elevator located thereon, a conveyer pivotally connected with the elevator, teeth pivotally mounted at the forward end of the conveyer, springs for holding the said teeth in normal position, cables attached to the forward portion of the said conveyer, a shaft journaled for rotation above the elevator, winding drums mounted upon said shaft, said cables adapted to be wound upon the peripheries of the said drums, and a tiltable rack mounted upon the frame and located below the delivery end of the elevator.

8. In a hay gatherer a wheel mounted frame, an elevator located thereon, a conveyer pivotally connected with the elevator, means for swinging the said conveyer upon its pivot, said conveyer having at its sides hinge sections, and springs connected with the said sections and adapted to hold the same in normal position, the said hinge sections adapted to come in contact with the sides of the elevator when said conveyer is swung upon its pivot.

9. In a hay gatherer a wheel mounted frame, an elevator located thereon, a conveyer pivotally connected with the elevator, means for swinging the said conveyer upon its pivot, teeth pivotally connected with the forward portion of the conveyer, means for holding the said teeth in normal position, chains mounted for orbital movement along the teeth, and protecting hoods for shielding the lower runs of the said chains against stubble.

In testimony that I claim the foregoing as my own, I have hereto affixed my signature in the presence of two witnesses.

NICHOLAS FRYMAN.

Witnesses:
  E. DANIELS,
  JAS. M. WALKER.